Feb. 23, 1937. A. G. SOLDT 2,071,956

MILK BOTTLE RECEPTACLE

Filed Oct. 28, 1936

INVENTOR.
Adolf G. Soldt
BY Williams Kiech & Morse,
ATTORNEYS

Patented Feb. 23, 1937

2,071,956

UNITED STATES PATENT OFFICE 2,071,956

MILK BOTTLE RECEPTACLE

Adolf G. Soldt, Long Island City, N. Y.

Application October 28, 1936, Serial No. 107,959

2 Claims. (Cl. 232—42)

This invention relates to milk bottle receptacles of the type adapted to be placed at, for example, a household service entrance to receive empty bottles for collection by a milk deliveryman and to receive bottles of milk upon delivery of such by the milk deliveryman.

An important object of the invention is to provide in permanent association with a receptacle of the above character a closure which is so constructed with relation to the receptacle proper that it may be effectively held in a partially open position so as to enable it to be readily opened to a sufficient extent to permit the removal of empty milk bottles and the insertion of full ones, and which is also so constructed that it, when moved to a fully closed position, will assume such a relation with respect to the receptacle proper that it will effectively serve to guard against the possibility of the receptacle being opened from such of its exterior as is exposed so long as the door of the entrance with which it is associated remains closed.

Other objects and advantages of the invention will become apparent from the following description when taken in connection with the accompanying drawing, in which—

Figure 1:
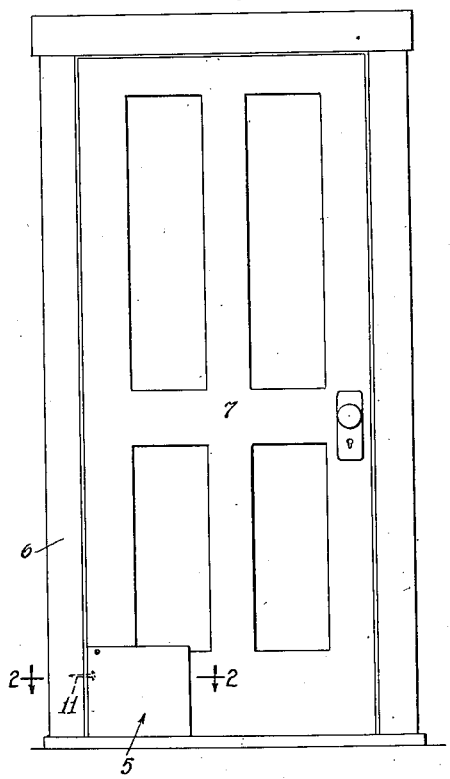
Fig. 1 is a front view of the receptacle as it appears when anchored to the jamb of a rearwardly opening door.
Figure 2:
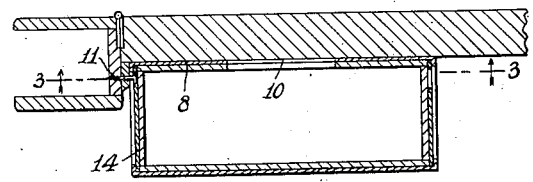
Fig. 2 is an enlarged fragmental horizontal sectional view taken on line 2—2 of Fig. 1.
Figure 3:
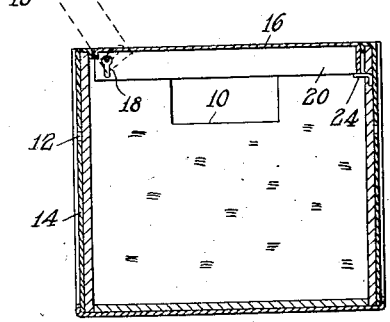
Fig. 3 is a vertical sectional view taken on line 3—3 of Fig. 2 and showing the receptacle closure in fully closed position and indicating such closure by dotted lines in fully open position.
Figure 4:
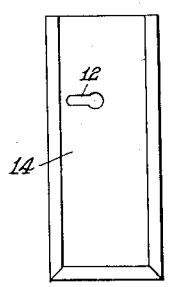
Fig. 4 is an end elevation of the receptacle as viewed from the left in Figs. 2 and 3.

Referring to the drawing, the numeral 5 indicates generally a milk bottle receptacle embodying the invention, such receptacle being shown in Fig. 1 as removably connected to the jamb 6 of a door 7 which, as will be readily understood from Fig. 2, is adapted to be moved to open position by swinging it rearwardly away from the receptacle about its hinged connection with the jamb. As illustrated in Fig. 2, the receptacle is so anchored to the door jamb 6 that the door 7, when closed, will engage or substantially engage the rear wall 8 of the receptacle and thus render such receptacle inaccessible by way of an opening 10 formed therein and adapted to enable one to readily grasp the receptacle and detach it from the door jamb when the door is open. In this connection it is to be observed that the receptacle can be removed from its anchored position only by moving it rearwardly, as when the door is open, inasmuch as the means for anchoring the receptacle in its positions shown in Figs. 1 and 2 includes, for example, a headed screw 11 carried by the door jamb and adapted to cooperate with a bayonet slot 12 so formed in the end wall 14 of the receptacle that its enlarged front end is adapted to permit passage therethrough of the head of the screw whereas its narrow rear portion is adapted to accommodate the shank of the screw.

Figure 5:
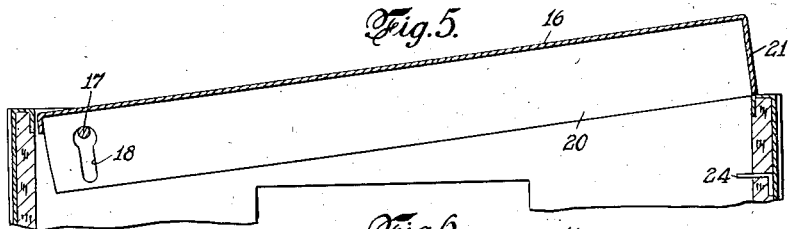
Fig. 5 is an enlarged fragmental sectional view showing the closure supported in a partially open position.
Figure 6:
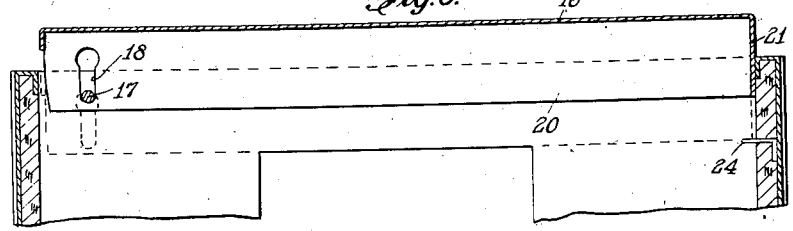
Fig. 6 is a view similar to that of Fig. 5 and illustrating in full lines the position of the closure with relation to the receptacle proper incident to its being moved to fully closed position indicated in dotted lines.

With the upper or receiving end of the receptacle proper there is permanently associated a closure 16 which is so connected to the receptacle as to enable it to be bodily moved from its fully closed position to a partially open position and thereafter swung to fully open position, and vice versa, that is, swung from its fully open position to a partially open position and thereafter bodily moved to its fully closed position. The means for connecting the closure 16 to the receptacle proper includes a hinge rod 17, which is located relatively near one end of the receptacle and is supported by the side walls thereof at a substantial distance below their upper edges. This hinge rod 17 is accommodated within a pair of slots 18 formed in depending side margin walls 20 of the closure 16, such slots being disposed substantially at right angles to the upper wall of the closure so as to permit that closure to be bodily moved upwardly from its fully closed position, indicated in dotted lines in Fig. 6, to its full-line position indicated therein, pursuant to which the free end of the closure may be swung upwardly about the hinge rod to such a position that its depending end margin 21 will slightly clear the adjacent end wall of the receptacle and will rest on that end wall when the pivoted end of the closure is moved downwardly to its position shown in Fig. 5. When the closure assumes its position shown in Fig. 5, it will be held against accidental closing, so long as its pivoted end is not lifted upwardly, by reason of the fact that the clearance afforded between the end wall 14 of the receptacle and the pivoted end of the closure is insufficient, even if the closure is shifted bodily toward that end wall, to permit the depending end margin wall 21 of the closure to move a sufficient distance on the adjacent end wall of the receptacle to allow the closure to drop to its fully closed postion indicated by the dotted lines of Fig. 6. However, upon lifting the pivoted end of the closure from its position shown in Fig. 5, as when it is desired to close the receptacle pursuant to depositing filled milk bottles therein, the closure assumes a position of alignment with the upper or open end of the receptacle and may be dropped or permitted to move to its fully closed position, in which position it is supported in part by the hinge rod 17 and in part by a bracket-like lug 24 secured to one of the end walls of the receptacle and arranged to receive thereon the end margin wall 21 of the closure.

Inasmuch as the closure 16 is so designed as to snugly fit within the receptacle and is so supported when it assumes a fully closed position that its upper wall is flush with the upper ends of the receptacle walls, such closure effectively serves to guard against the possibility of the receptacle being opened so long as the door of the entrance with which it is associated remains closed. Thus it will be appreciated that the receptacle, in addition to being utilized as a depository for empty milk bottles to be collected by the milk deliveryman, is adapted, once its closure is moved to closed position by such deliveryman, to effectively guard his delivery of bottled milk against theft or other undue removal, it being observed that access to the receptacle can be gained, as by a servant or other authorized person, only upon opening the service entrance door and then lifting the closure 16 from beneath by inserting one's hand or fingers through the opening 10. If desired, the receptacle may be readily detached from its anchored position on the door jamb 6 and carried, together with its contents, indoors preparatory to opening the closure 16, the removal and carrying of the receptacle being facilitated by reason of the fact that the opening 10 allows one to insert the fore part of his hand into the receptacle and thus obtain a hand hold on the rear wall of the same.

Although only one form of the invention is herein shown and described, it will be understood that various changes may be made without departing from the spirit of the invention or the scope of the following claims.

What is claimed is:

1. A milk bottle receptacle having at its upper end a receiving opening, a closure conforming generally to the shape of said opening and dimensioned to snugly fit therein when in fully closed position and including a top wall, an end wall and a pair of side walls, said side walls having a pair of slots formed therein and extending downwardly from said top wall, and a pivot rod accommodated within said slots and constituting pivot means connecting one end of said closure to said receptacle for bodily vertical movement of said closure from fully closed position toward open position and for thereafter facilitating pivotal movement of said closure to a partially open position and for then facilitating downward movement of the pivoted end of said closure to its normal position of rest whereby the free end of said closure assumes an overlying relation to the adjacent portion of the wall of that opening.

2. A milk bottle receptacle having at its upper end a receiving opening, a closure conforming generally to the shape of said opening and dimensioned to snugly fit therein when in fully closed position and including a top wall, an end wall and a pair of side walls, said side walls having a pair of slots formed therein and extending downwardly from said top wall, and a pivot rod accommodated within said slots and constituting pivot means connecting one end of said closure to said receptacle for bodily vertical movement of said closure from fully closed position toward open position and for thereafter facilitating pivotal movement of said closure to a partially open position and for then facilitating downward movement of the pivoted end of said closure to its normal position of rest whereby the free end of said closure assumes an overlying relation to the adjacent portion of the wall of that opening, the pivoted end of said closure when in partially open position being spaced from the adjacent portion of the wall of said opening a distance less than the extent to which the free end of said closure then overlies that wall whereby said closure is held against lateral displacement to a sufficient extent to enable it to assume entering position with relation to said opening.

ADOLF G. SOLDT.